US009928973B2

(12) United States Patent
Claessens et al.

(10) Patent No.: US 9,928,973 B2
(45) Date of Patent: Mar. 27, 2018

(54) DIELECTRIC INSULATION MEDIUM

(71) Applicants: Max-Steffen Claessens, Untersiggenthal (CH); Per Skarby, Wurenlos (CH)

(72) Inventors: Max-Steffen Claessens, Untersiggenthal (CH); Per Skarby, Wurenlos (CH)

(73) Assignee: ABB Technology AG (CH)

( * ) Notice: Subject to any disclaimer, the term of this patent is extended or adjusted under 35 U.S.C. 154(b) by 201 days.

(21) Appl. No.: 14/192,224

(22) Filed: Feb. 27, 2014

(65) Prior Publication Data

US 2014/0175341 A1 Jun. 26, 2014

Related U.S. Application Data

(60) Division of application No. 13/189,316, filed on Jul. 22, 2011, now Pat. No. 8,704,095, which is a continuation of application No. PCT/EP2009/057294, filed on Jun. 12, 2009.

(51) Int. Cl.
*H01B 3/56* (2006.01)
*H01H 9/02* (2006.01)
*H02B 13/055* (2006.01)
*H01H 11/00* (2006.01)
*H01H 33/56* (2006.01)

(52) U.S. Cl.
CPC ............ *H01H 9/02* (2013.01); *H01B 3/56* (2013.01); *H01H 11/00* (2013.01); *H02B 13/055* (2013.01); *H01H 33/56* (2013.01)

(58) Field of Classification Search
CPC .......................................... H01B 3/56
USPC .......................................... 252/571
See application file for complete search history.

(56) References Cited

U.S. PATENT DOCUMENTS

| 3,150,245 | A |   | 9/1964  | Leeds et al. |
| 3,185,734 | A | * | 5/1965  | Fawcett ................. C07C 45/00 568/364 |
| 3,201,728 | A |   | 8/1965  | McWhirter |
| 4,071,461 | A |   | 1/1978  | Mears et al. |
| 4,136,121 | A |   | 1/1979  | Martini et al. |
| 4,162,227 | A |   | 7/1979  | Cooke |
| 4,166,798 | A |   | 9/1979  | Mastroianni et al. |
| 4,175,048 | A |   | 11/1979 | Christophorou et al. |
| 4,288,651 | A |   | 9/1981  | Wootton |
| 4,296,003 | A |   | 10/1981 | Harrold et al. |
| 4,350,838 | A |   | 9/1982  | Harrold |
| 4,440,971 | A |   | 4/1984  | Harrold |
| 5,247,101 | A | * | 9/1993  | Takago ................. C07D 319/12 549/347 |
| 5,399,718 | A |   | 3/1995  | Costello et al. |
| 5,466,877 | A |   | 11/1995 | Moore |
| 5,730,894 | A |   | 3/1998  | Minor |
| 5,858,065 | A |   | 1/1999  | Li et al. |
| 5,998,671 | A |   | 12/1999 | Van Der Puy |
| 6,276,190 | B1 |  | 8/2001  | Zamfes |
| 6,394,107 | B1 | * | 5/2002 | Kesari ................. C07C 45/00 134/2 |
| 6,403,149 | B1 |  | 6/2002  | Parent et al. |
| 6,478,979 | B1 |  | 11/2002 | Rivers et al. |
| 7,074,343 | B2 |  | 7/2006  | Minor et al. |
| 7,102,101 | B1 | * | 9/2006 | Johnson ............... H01H 33/562 219/201 |
| 7,128,133 | B2 |  | 10/2006 | Costello et al. |
| 7,184,895 | B2 |  | 2/2007  | Chetay et al. |
| 7,314,576 | B2 |  | 1/2008  | Minor et al. |
| 7,390,427 | B2 |  | 6/2008  | Costello et al. |
| 7,416,679 | B2 |  | 8/2008  | Minor et al. |
| 7,736,529 | B2 |  | 6/2010  | Luly et al. |
| 7,742,283 | B2 |  | 6/2010  | Hama et al. |
| 7,816,618 | B2 |  | 10/2010 | Uchii |
| 7,923,630 | B2 |  | 4/2011  | Richardson |
| 8,080,185 | B2 |  | 12/2011 | Luly et al. |
| 8,245,512 | B2 |  | 8/2012  | Schwiegel et al. |
| 2002/0095262 | A1 | | 7/2002 | Chetay et al. |
| 2003/0007543 | A1 | * | 1/2003 | Grenfell .................. G01M 3/10 374/57 |
| 2003/0019841 | A1 | * | 1/2003 | Kesari ................. C23C 16/4405 216/67 |
| 2004/0056234 | A1 | | 3/2004 | Belt et al. |
| 2004/0197474 | A1 | | 10/2004 | Vrtis et al. |
| 2005/0127322 | A1 | | 6/2005 | Costello et al. |
| 2005/0188697 | A1 | * | 9/2005 | Zyhowski ............... C09K 5/045 60/671 |
| 2006/0210711 | A1 | | 9/2006 | Hayashi et al. |
| 2007/0221626 | A1 | | 9/2007 | Uchii |

(Continued)

FOREIGN PATENT DOCUMENTS

CA      2420574 C    3/2002
CA      2516996 C    9/2004

(Continued)

OTHER PUBLICATIONS

Brand, "Dielectric Strength, Boiling Point and Toxicity of Gases—Different Aspects of the Same Basic Molecular Properties"; Oct. 1982; pp. 451-456.
3M(tm); "Fluorochemicals in Heat Transfer Applications"; Jun. 21, 2000; 27 pages.
Tuma, "Fluoroketone C2F5C(O)CF(CF3)2 as a Heat Transfer Fluid for Passive and Pumped 2-Phase Applications"; 24th IEEE SemiOTherm Symposium; 2008; 8 pages.
Christophorou, et al.; "Gases for electrical insulation and arc interruption : possible present and future alternatives to pure SF6"; NIST Technical Note 1425; Nov. 1997; 48 pages.
Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

(Continued)

*Primary Examiner* — Nicole M Buie-Hatcher
*Assistant Examiner* — M. Reza Asdjodi
(74) *Attorney, Agent, or Firm* — St. Onge Steward Johnston & Reens, LLC

(57) ABSTRACT

A dielectric insulation medium. The insulation medium is characterized in that it comprises a fluoroketone having from 4 to 12 carbon atoms.

22 Claims, 5 Drawing Sheets

(56) References Cited

U.S. PATENT DOCUMENTS

| | | | |
|---|---|---|---|
| 2008/0135718 A1* | 6/2008 | Lee | B22C 9/103 |
| | | | 249/62 |
| 2008/0135817 A1 | 6/2008 | Luly et al. | |
| 2009/0078680 A1 | 3/2009 | Franck et al. | |
| 2009/0095717 A1 | 4/2009 | Luly et al. | |
| 2009/0109604 A1 | 4/2009 | Yanabu et al. | |
| 2009/0260484 A1* | 10/2009 | Sanui | B22D 21/007 |
| | | | 75/709 |
| 2011/0192821 A1 | 8/2011 | Dufournet | |
| 2011/0232870 A1 | 9/2011 | Flynn et al. | |
| 2012/0085735 A1 | 4/2012 | Uchii et al. | |
| 2012/0145521 A1 | 6/2012 | Glasmacher | |
| 2012/0152904 A1 | 6/2012 | Hyrenbach et al. | |
| 2014/0175341 A1* | 6/2014 | Claessens | H01B 3/56 |
| | | | 252/571 |

FOREIGN PATENT DOCUMENTS

| | | | |
|---|---|---|---|
| CN | 101197221 A | 6/2008 | |
| DE | 548450 C * | 4/1932 | B65G 51/42 |
| DE | 548450 C | 6/1934 | |
| DE | 641963 C | 2/1937 | |
| DE | 3215234 A1 | 10/1983 | |
| DE | 19519301 A1 | 11/1996 | |
| DE | 10129747 C1 | 2/2003 | |
| DE | 20220204 U1 | 4/2004 | |
| DE | 202009009305 U1 | 11/2009 | |
| DE | 102009025204 C5 | 1/2013 | |
| EP | 0131922 A1 | 1/1985 | |
| EP | 0545430 A1 | 6/1993 | |
| EP | 0670294 B1 | 9/1995 | |
| EP | 1085365 A2 | 3/2001 | |
| EP | 1132746 A2 | 9/2001 | |
| EP | 1146522 A1 | 10/2001 | |
| EP | 1221612 A1 | 7/2002 | |
| EP | 1261398 B1 | 12/2002 | |
| EP | 1498941 A2 | 1/2005 | |
| EP | 1764487 A1 | 3/2007 | |
| EP | 1933432 A1 | 6/2008 | |
| EP | 2525454 A2 | 11/2012 | |
| FR | 2930019 A1 * | 10/2009 | C09K 5/04 |
| FR | 2955970 A1 | 8/2011 | |
| GB | 753375 A | 7/1956 | |
| GB | 1194431 A | 6/1970 | |
| JP | 8306549 A | 11/1996 | |
| JP | 2738997 B2 | 4/1998 | |
| JP | 2879848 B1 | 4/1999 | |
| JP | 11286679 A | 10/1999 | |
| JP | 2000059935 A | 2/2000 | |
| JP | 2000224722 A | 8/2000 | |
| JP | 2001086611 A | 3/2001 | |
| JP | 2005126480 A | 5/2005 | |
| JP | 2007300716 A | 11/2007 | |
| JP | 2010021263 A | 1/2010 | |
| JP | 2010021283 A | 1/2010 | |
| JP | 2010131584 A | 6/2010 | |
| JP | 2010171173 A | 8/2010 | |
| KR | 20070080895 A | 8/2007 | |
| RU | 2276164 C2 | 5/2006 | |
| WO | 0024814 A1 | 5/2000 | |
| WO | 0105468 A2 | 1/2001 | |
| WO | 0250173 A2 | 6/2002 | |
| WO | 02086191 A1 | 10/2002 | |
| WO | 02086192 A1 | 10/2002 | |
| WO | 02103319 A1 | 12/2002 | |
| WO | 03022981 A1 | 3/2003 | |
| WO | 2004090177 A1 | 10/2004 | |
| WO | 2007013169 A1 | 2/2007 | |
| WO | 2007075804 A1 | 7/2007 | |
| WO | 2007136948 A2 | 11/2007 | |
| WO | 2008073790 A2 | 6/2008 | |
| WO | 2010108934 A1 | 9/2010 | |
| WO | 2010142346 A1 | 12/2010 | |
| WO | 2010142353 A1 | 12/2010 | |
| WO | 2010146022 A1 | 12/2010 | |
| WO | 2011019456 A1 | 2/2011 | |
| WO | 2011054870 A1 | 5/2011 | |
| WO | 2011090992 A1 | 7/2011 | |
| WO | 2011119421 A1 | 9/2011 | |
| WO | 2011119456 A1 | 9/2011 | |
| WO | 2012038442 A1 | 3/2012 | |
| WO | 2012038443 A1 | 3/2012 | |

OTHER PUBLICATIONS

Seimens Alarm Brochure—2005; 40 pages.
Abb, et al.; "Valhall Re-Development Project, Power From Shore"; Mar. 17, 2010; 5 pages.
3M(tm) Novec(tm) 1230 Fire Protection Fluid—Brochure ©3M 2008; 6 pages.
3M(tm) Flüssigkeiten für das Wärmemanagement und Elektro-/Elektronik-Testen—Brochure © 3M 2010; 8 pages.
Yamamoto et al, "Applying a Gas Mixture Containing c-C4F8 as an Insulation Medium", IEEE Transactions on Dielectrics and electrical Insulation, vol. 8, No. 6, Dec. 2001 (abstract only—2 pages.).
Cartwright, et al.; "Barrow Offshore Windfarm Design & Build of UKs First OWF Sub-Station"; Vestas KBR; Oct. 2005; 26 pages.
Kynast, et al.; "Basic investigations concerning equipment with liquefied SF6 under extreme low temperatures"; Technical Colloquium; 2011; 8 pages.
Anonymous: "CBWatch—2 Modular Circuit Breaker Monitoring System"; Alstom Product Brochure; Sep. 1, 2010; 4 pages.
Niemeyer, Lutz. "CIGRE Guide for SF6 gas mixtures. Application and Handling in electric power Equipment." ABB Corp Research Cetre; 2000; 8 pages.
Hillers, et al.; "Control, Monitoring and Diagnostics for High Voltage GIS"; IEE Colloquim on GIC (Gas-Insulated Switchgear); Nov. 14, 1995; pp. 6/1-6/4.
Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.
3M Novec 1230 Fire Protection Fluid Article; Electronics Markets Materials Division; Issued Apr. 2009; Printed in USA. 8 pages.
3M Novec 649 Engineered Fluid; Electronics Markets Materials Division; Issued Sep. 2009. Printed in USA. 4 pages.
Phil E. Tuma, A Low-GWP Fluoroketone: Potential Alternative to SF6 in Some Dielectric Applications; NEMA Ad Hoc Task Group on SF6, Feb. 2009; Hyatt Regency, Phoenix; 8 pages.
Paul E. Riverm "Advancement in Sustainable Fire Suppression Development C, F-Ketone: A Novel New Halon Replacement Alternative to HFCS and PFCS", 3M Specialty Materials Division, Halon Options Technical Working Conference Apr. 24-26, 2001, pp. 341-348.
Briefing Paper on SF6 as a global Warming Concern; NEMA: Setting Standards for Excellence; 2 pages.
J. Owens, et al; "Experimentation Using Segregated Hydrofluoroethers and Fluorinated Ketones as Dielectric Vapors"; National Conference on SF6 and the Environment; San Diego, California; Nov. 2002; 8 pages.
R. Garzon; "High Voltage Circuit Breakers—Design and Applications"; Marcel Dekker, Inc; 1997; New York; pp. 139-141; 162-163; 170-177.
"International Conference on SF6 and the Environment—Emission Reduction Strategies: Final Attendee List" Nyndham San Diego at Emerald Plaza; Nov. 2002; 8 pages.
D. Gautschi, et al; "Ist SF6 in Hochspannungsschaltanlagen ersetzbar"; Branche Installations De Couplage; Bulletin Dec. 2014; pp. 43-46.
NEMA Ad Hoc Task Group on SF6;Hyatt Regency Phoenix; Oct. 2008; 2 pages.
SF6-isolierte Schaltanlagen bis 52kV; Dip-Ing. Andreas Reimuller, Leiter Produktmanagement GIS, ABB AG; 7 pages.
The Institute of Electrical Engineers in Japan; 2005. 1 page.

(56) References Cited

OTHER PUBLICATIONS

Transformer Oil; Wikipedia Definition; received from http://en.wikipedia.org/w/index.php?title=Transformer_oil&oldid=650781383>; 5 pages.
ZX-Family—Gas-insulated medium voltage switchgear;ABB AG; 2009; 6 pages.

* cited by examiner

DIELECTRIC INSULATION MEDIUM

FIELD OF THE INVENTION

The present invention relates to a dielectric insulation medium and to the use of a fluoroketone in such an insulation medium. The invention further relates to an apparatus for the generation, the distribution or the usage of electrical energy, and a dimensioning method.

BACKGROUND OF THE INVENTION

Dielectric insulation media in liquid or gaseous state are conventionally applied for the insulation of an electrical active part in a wide variety of electrical apparatuses, such as switchgears or transformers.

In medium or high voltage metal-encapsulated switchgears, for example, the electrical active part is arranged in a gas-tight housing, which defines an insulating space, said insulation space comprising an insulation gas usually with several bar pressure and separating the housing from the electrical active part without letting electrical current to pass through. Thus, metal-encapsulated switchgears allow for a much more space-saving construction than switchgears which are mounted outdoors and insulated solely by ambient air. For interrupting the current in a high voltage switchgear, the insulating gas further functions as an arc extinction gas.

Conventionally used insulation gases with high insulation and switching performance have some environmental impact when released to the atmosphere. So far, the high global warming potential (GWP) of these insulation gases has been coped with by strict gas leakage control in gas-insulated apparatuses and by very careful gas handling. Conventional environmental-friendly insulation gases like e.g. dry air or $CO_2$ have a quite low insulation performance, so that gas pressure and/or insulation distances would have to be increased.

For the reasons mentioned above, efforts have been made in the past to replace these conventional insulation gases by suitable substitutes.

For example, WO 2008/073790 discloses a dielectric gaseous compound which—among other characteristics—has a boiling point in the range between about −20° C. to about −273° C., which is low, preferably non-ozone depleting and which has a GWP less than about 22,200. Specifically, WO 2008/073790 discloses a number of different compounds which do not fall within a generic chemical definition.

Further, U.S. Pat. No. 4,175,048 relates to a gaseous insulator comprising a compound selected from the group of perfluorocyclohexene and hexafluoroazomethane, and EP-A-0670294 discloses the use of perfluoropropane as a dielectric gas.

EP-A-1933432 refers to trifluoroiodomethane ($CF_3I$) and its use as an insulating gas in a gas-insulated switchgear. In this regard, the document mentions both the dielectric strength and the interrupting performance to be important requirements for an insulating gas. $CF_3I$ has according to EP-A-1933432 a GWP of 5 and is thus considered to cause relatively low environmental load. However, because of the relative high boiling point of $CF_3I$ (−22° C.) gas mixtures with $CO_2$ are taught. Additionally, pure $CF_3I$-gas has about the same insulation performance as conventional insulation media having a high insulation and switching performance, so that the proposed gas mixtures have around 80% of the specific insulation performance of a pure conventional insulation medium which would have to become compensated by increased filling pressure and/or larger insulation distance.

Therefore there is an ongoing need for an insulation medium which causes even less environmental load than $CF_3I$ and does not require an increase of the gas pressure and/or the insulation distances above today usual values.

SUMMARY OF THE INVENTION

In view of this, the objective of the present invention is thus to provide an insulating medium having a reduced GWP, but having at the same time comparable or even improved insulation properties in comparison to the known insulation media without an increase of the gas pressure and/or the insulation distances above today applied values.

This objective is achieved by the insulation medium according to the independent claims. Preferred embodiments of the invention are given in the dependent claims.

The invention is based on the surprising finding that by using a fluoroketone having from 4 to 12 carbon atoms an insulation medium having high insulation capabilities, in particular a high dielectric strength (or breakdown field strength), and at the same time an extremely low global warming potential (GWP) can be obtained.

In general, the fluoroketone according to the present invention has the general structure

wherein R1 and R2 are at least partially fluorinated chains, said chains being independently from each other linear or branched and having from 1 to 10 carbon atoms. The definition encompasses both perfluorinated ketones as well as hydrofluorinated ketones.

Generally, the fluoroketone used according to the present invention has a boiling point of at least −5° C. at ambient pressure which is in clear contrast to the teaching of the state of the art and in particular of WO 2008/073790 which teaches a boiling point of −20° C. or lower to be an essential feature of a feasible dielectric compound.

Preferably, the fluoroketone has from 4 to 10 carbon atoms, more preferably from 4 to 8 carbon atoms, and most preferably 6 carbon atoms (also referred to as a C6-fluoroketone). As mentioned above, said C6-fluoroketone can be a perfluorinated ketone (having the molecular formula $C_6F_{12}O$) or a hydrofluorinated ketone.

In use, the insulation medium can be both in liquid and gaseous state. In particular, the insulation medium can be a two-phase system comprising the fluoroketone both in liquid and gaseous state. More particularly, the insulation medium can be an aerosol comprising droplets of the fluoroketone dispersed in a gas phase comprising fluoroketone in gaseous state.

For many applications, it is preferred that the insulation medium comprises an insulation gas comprising the fluoroketone at operational conditions. This is in particular the case for an insulation medium used for high voltage switching in a corresponding switchgear.

If an insulation gas is used, it can either be a gas mixture, which apart from the fluoroketone preferably comprises air or at least one air component, in particular selected from the group consisting of carbon dioxide ($CO_2$), oxygen ($O_2$) and nitrogen ($N_2$), as buffer or carrier gas. Alternatively, the insulation gas can substantially consist of fluoroketone.

The insulation properties of the insulation gas, and in particular its breakdown field strength, can be controlled by the temperature, pressure and/or composition of the insulation medium. If a two-phase system comprising the fluoroketone both in liquid and gaseous state is used, an increase of the temperature does not only result in an increase of the absolute pressure, but also in an increase of the fluoroketone's concentration in the insulation gas due to a higher vapour pressure.

It has been found that for many applications of the insulation gas, such as applications in the medium voltage range, a sufficient molar ratio, i.e. the ratio between the number of molecules of the fluoroketone to the number of molecules of the remaining components of the medium (generally the carrier or buffer gas), and thus also a sufficient breakdown field strength can be achieved even at very low operational temperatures e.g. of down to about −30° C. or even −40° C., without additional measures such as external heating or vaporization.

If a higher concentration of the fluoroketone in the insulation gas is desired to increase the breakdown field strength, which may in particular be the case in high voltage applications, the pressure, the composition and/or the temperature of the insulation medium can be adapted accordingly. A way how to deduce the parameters required to obtain a desired breakdown field strength will be further exemplified in the context of the Figures below.

The dielectric insulation medium of the present invention can be used in any apparatus for the generation, the distribution or the usage of electrical energy, particularly in a switchgear or a part and/or component thereof.

For high voltage switching, for example, the interrupting capability (or arc extinction capability) of the insulation medium is of particular importance. It has surprisingly been found that the medium according to the present invention not only has a comparable or even improved insulating capability compared to the above mentioned conventional insulation media, but also a sufficient arc extinction capability. Without any intention to be bound by the theory it is assumed that this arc extinction capability can at least partially be attributed to the recombination of the dissociation products of the fluoroketone inside the arcing region mainly to tetrafluoromethane ($CF_4$) which is well known to be a highly potent arc extinction medium.

Another important aspect during arc interruption is the temperature increase of the switching gas in the whole vessel which may lead to insulation failures to the grounded vessel even after successful arc interruption inside the switching gap, especially after heavy fault interruption in metal-encapsulated circuit breakers. Due to the decomposition of fluoroketones at moderate temperatures (e.g. around 550° C. to 570° C. for C6-fluoroketone) to lower fluorocarbons, the injected heat energy in the exhaust volumes does not lead to temperatures above these dissociation temperatures, until all fluoroketone is dissociated. If sufficient fluoroketone is provided, the exhaust gas temperature therefore cannot exceed the above mentioned temperatures leading to a good insulation performance also shortly after the interruption of a heavy fault current in a metal-encapsulated high-voltage circuit breaker.

Among the most preferred fluoroketones having 6 carbon atoms, dodecafluoro-2-methylpentan-3-one has been found to be particularly preferred for its high insulating properties and its extremely low GWP.

Dodecafluoro-2-methylpentan-3-one (also named 1,1,1,2,2,4,5,5,5-nonafluoro-4-(trifluoromethyl)-3-pentanone, perfluoro-2-methyl-3-pentanone or $CF_3CF_2C(O)CF(CF_3)_2$) has previously only been considered useful for completely different applications, namely the processing of molten reactive metals (as referred to in WO 2004/090177), for the cleaning of a vapour reactor (as referred to in WO 02/086191) and in fire extinction systems, or in liquid form for cooling of electronic systems, or for the Rankine-process in small power plants (as referred to in EP-A-1764487).

Dodecafluoro-2-methylpentan-3-one is clear, colorless and almost odourless. Its structural formula is given in the following:

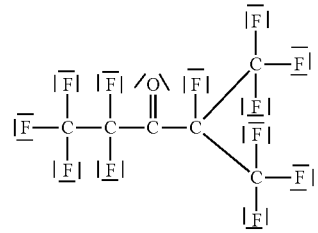 [SMILES: O=C(C(F)(F)C(F)(F)F)C(F)(C(F)(F)F)C(F)(F)F]

Dodecafluoro-2-methylpentan-3-one has an average lifetime in the atmosphere of about 5 days and its GWP is only about 1. In addition, its ozone depletion potential (ODP) is zero. Thus, the environmental load is much lower than the one of conventional insulation gases.

In addition, dodecafluoro-2-methylpentan-3-one is non-toxic and offers outstanding margins of human safety. This is in contrast to fluoroketones having less than 4 carbon atoms, such as hexafluoroacetone (or hexafluoropropanone), which are generally toxic and very reactive.

Dodecafluoro-2-methylpentan-3-one has a boiling point of 49.2° C. at 1 bar. Its vapour pressure, i.e. the pressure of the vapor in equilibrium with its non-vapor phases, is about 40 kPa at 25° C. Given the high vapour pressure of dodecafluoro-2-methylpentan-3-one, an insulation gas having a breakdown field strength sufficient for many applications, in particular in the medium voltage range, can in general also be achieved at very low temperatures down to −30° C.

If the insulation medium is an insulation gas, as it is for example preferably the case in a circuit breaker of a high voltage switchgear, dodecafluoro-2-methylpentan-3-one can either be provided in a gas mixture, which preferably further comprises air or at least one air component functioning as a carrier or buffer gas. Alternatively, the insulating gas can substantially consist of dodecafluoro-2-methylpentan-3-one.

Based on the finding that at a temperature of 550° C. or higher, dodecafluoro-2-methylpentan-3-one is decomposed to very reactive fluorocarbon compounds having a lower number of carbon atoms, it is preferred that the insulating gas comprises sufficient oxygen ($O_2$) with which the fluorocarbon compounds formed can react to form inert compounds, such as e.g. $CO_2$.

According to a particularly preferred embodiment of the present invention, the molar ratio of the fluoroketone, in particular of dodecafluoro-2-methylpentan-3-one, in the insulation gas is at least 1%, preferably at least 2%, more preferably at least 5%, more preferably at least 10%, most preferably at least 15%. These preferred molar ratios refer to a given standard or prescribed operating condition. Under deviating conditions, the molar ratio may still vary from these preferred values.

The significance of an insulating medium comprising dodecafluoro-2-methylpentan-3-one in a molar ratio of at least 1%, or 2% respectively, is based on the finding that an insulation gas having this molar ratio can also be obtained at very low temperature conditions down to −30° C. for 2% and down to −40° C. for 1% and that this insulation gas has a sufficient dielectric strength for e.g. medium voltage apparatuses, such as medium voltage gas-insulated switchgears, which are operated at an insulation gas pressure of around 1 bar and in particular below 1.5 bar.

As will be further illustrated by way of the examples, the insulating capability of an insulating gas having a molar ratio of dodecafluoro-2-methylpentan-3-one of at least 15% is (at 1 bar) even higher than that of conventional insulating gases. This embodiment is thus particularly preferred.

It is a further objective of the present invention to provide improved dielectric insulation and improved electrical apparatuses comprising the insulation medium described above. This objective is achieved according to the claims by the use of the above-described fluoroketone for dielectric insulation and, in particular, for arc extinction, and according to the claims by an apparatus comprising the above-described fluoroketone. Preferred embodiments are disclosed and claimed in the dependent claims.

Therefore, in addition to the insulation medium described above, the present invention further relates to an apparatus for the generation, the distribution and the usage of electrical energy, said apparatus comprising a housing defining an insulating space and an electrical active part arranged in the insulating space. This insulating space comprises the insulation medium described above.

The term "or" in the expression "apparatus for the generation, the distribution or the usage of electrical energy" is in this context not to be understood as excluding combinations but is to be read as "and/or".

Also, the term "electrical active part" in this context is to be interpreted broadly including a conductor, a conductor arrangement, a switch, a conductive component, a surge arrester, and the like.

In particular, the apparatus of the present invention includes a switchgear, in particular an air-insulated or gas-insulated metal (or otherwise)-encapsulated switchgear, or a part and/or component thereof, in particular a bus bar, a bushing, a cable, a gas-insulated cable, a cable joint, a current transformer, a voltage transformer, a surge arrester, an earthing switch, a disconnector, a load-break switch, and/or a circuit breaker.

Switchgears, in particular gas-insulated switchgears (GIS), are well known to a person skilled in the art. An example of a switchgear for which the present invention is particularly well suited is for example shown in EP-A-1933432, paragraphs [0011] to [0015], the disclosure of which is incorporated herewith by reference.

It is further preferred that the apparatus is a switch, in particular an earthing switch (e.g. a fast acting earthing switch), a disconnector, a load-break switch or a circuit breaker, in particular a medium-voltage circuit breaker, a generator circuit breaker and/or a high-voltage circuit breaker.

According to another preferred embodiment, the apparatus can be a transformer, in particular a distribution transformer or a power transformer.

According to still other embodiments, the apparatus can also be, e.g., an electrical rotating machine, a generator, a motor, a drive, a semiconducting device, a computing machine, a power electronics device, and/or a component thereof.

The invention particularly relates to a medium or high voltage apparatus. The term "medium voltage" as used herein refers to a voltage in the range of 1 kV to 72 kV, whereas the term "high voltage" refers to a voltage of more than 72 kV. Applications in the low voltage range below 1 kV are feasible, as well.

In order to set the respective parameters to the required value for achieving a desired breakdown field strength, the apparatus can comprise a control unit (also referred to as "fluid management system") for controlling individually or in combination the composition—in particular the chemical composition or the physical phase composition, such as a gas/liquid two-phase system—and/or the temperature of the insulation medium as well as the absolute pressure, the gas density, the partial pressure and/or the partial gas density of the insulation medium or at least one of its components, respectively. In particular, the control unit can comprise a heater and/or vaporizer in order to control the vapour pressure of the fluoroketone according to the invention. The vaporizer can e.g. be an ultrasound vaporizer, or can comprise spraying nozzles for spraying the insulation medium into the apparatus.

In an exemplary embodiment for high voltage applications, a partial pressure of the fluoroketone can be provided in the insulating medium by heating and/or vaporizing, such that the partial pressure of fluoroketone is maintained at a pressure level of at least 0.6 bar in gas-insulated switchgears (GIS) busbars or gas-insulated transmission lines (GITL), corresponding to conventional insulation distances (with approximately required field strengths of about 300 kV/cm) and conventional pressure levels of e.g. about 4 bar. Accordingly, in a high-voltage circuit breaker the heating and/or vaporizing shall be adapted such that the partial pressure of the fluoroketone is maintained at a pressure level of at least 0.9 bar, corresponding to conventional insulation distances (with approximately required field strengths of about 440 kV/cm) and conventional pressure levels of e.g. about 6 bar.

If a vaporizer is used, it usually also comprises a dosing unit to set the concentration of the fluoroketone in the insulation medium according to needs of breakdown field strength. This will exemplarily be shown in more detail below for a high voltage gas-insulated switchgear. Furthermore, the control unit may comprise a measuring unit for measuring the control parameters, such as temperature, pressures and/or composition—in particular the liquid phase level—and/or a monitoring unit for monitoring such parameters.

BRIEF DESCRIPTION OF THE DRAWINGS

The invention is further illustrated by way of the following Example in combination with the Figures of which

DETAILED DESCRIPTION OF THE INVENTION

EXAMPLES

For measuring the breakdown field strength of an insulation medium according to the present invention, a test vessel comprising dodecafluoro-2-methylpentan-3-one (Novec 649, available from 3M) was evacuated down to about 140 mbar and the pressure was successively increased by adding ambient air as buffer gas up to about 5 bar. For selected mole fractions of dodecafluoro-2-methylpentan-3-one in the resulting insulation gas, the breakdown field strength was determined in a pin-plate electrode arrangement under dc-voltage applied.

Figure 1A:
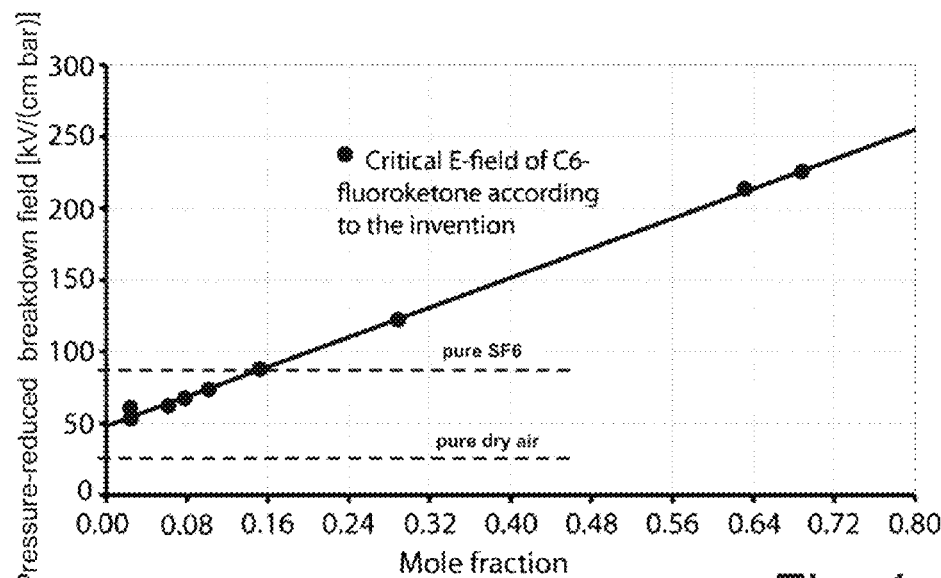
FIG. 1a shows a graphical representation of the pressure reduced breakdown field of an insulating medium according to the present invention as a function of its mole fraction of dodecafluoro-2-methylpentan-3-one in comparison to the breakdown field of conventional insulation gases.

As shown in FIG. 1a, the pressure-reduced breakdown field strength for the insulation medium according to the present invention increases linearly as a function of an increasing mole fraction of the fluorketone of the present invention, here selected to be dodecafluoro-2-methylpentan-3-one. At a mole fraction above 15%, the insulation medium according to the present invention has a breakdown voltage higher than the most conventional insulation gas according to the state of the art.

Figure 1B:
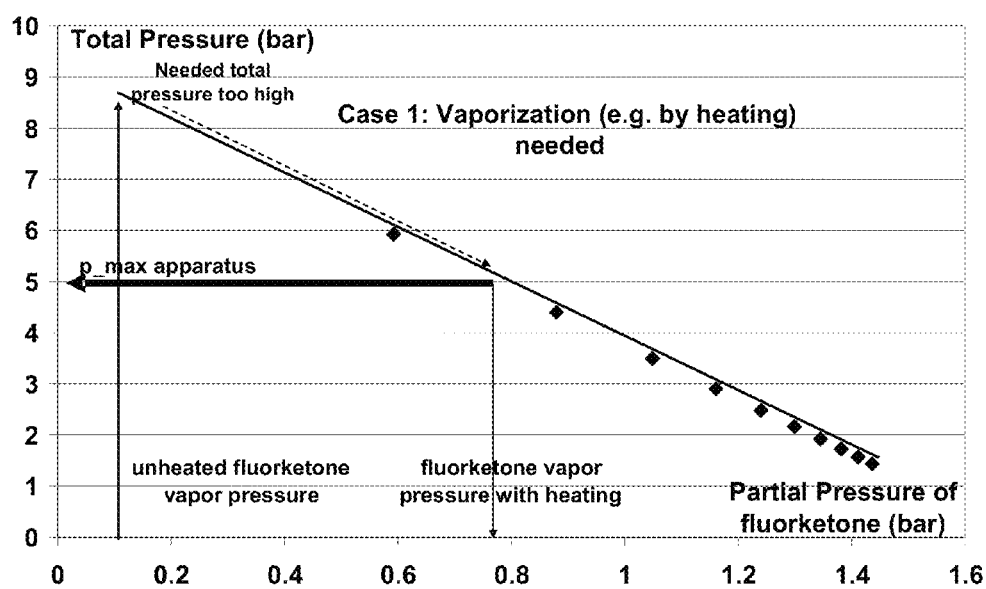
FIGS. 1b-1c show the absolute pressure of the insulation medium as a function of the partial pressure of dodecafluoro-2-methylpentan-3-one
Figure 1C:
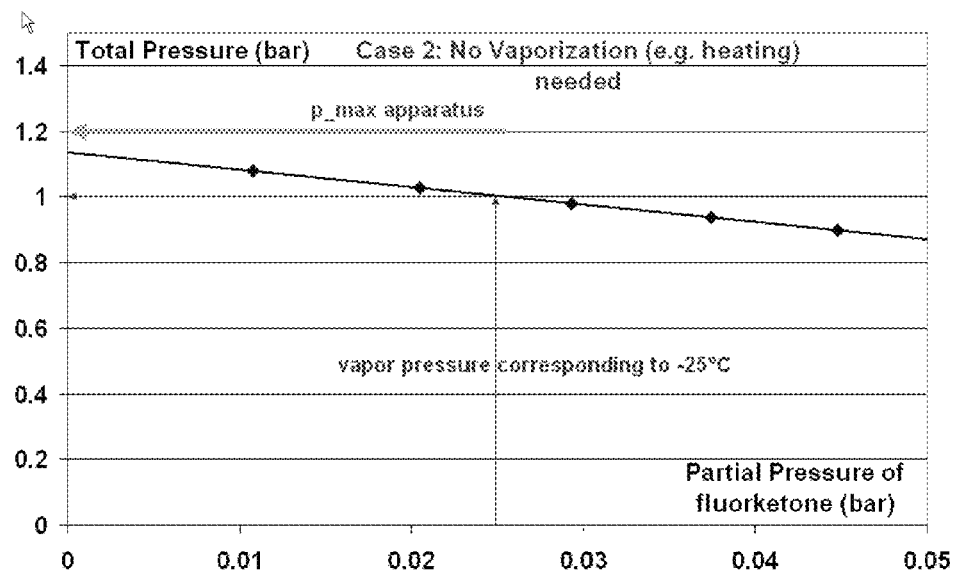

FIGS. 1b and 1c show the absolute filling pressure of the insulation medium according to the present invention as a function of the mole fraction of the fluorketone of the present invention, here selected to be dodecafluoro-2-methylpentan-3-one. FIG. 1b and 1c are obtained from FIG. 1a by choosing a permissible field strength of the electrical apparatus, by transforming the abscissa (y-axis) of FIG. 1a by dividing the values by the permissible field strength and inverting the resulting values to arrive at an absolute pressure scale and hence absolute pressure curve, and by multiplying the ordinate (x-axis) with the absolute pressure curve to arrive at the partial pressure of the fluorketone of the invention, here preferably of dodecafluoro-2-methylpentan-3-one. The permissible field strength is chosen to be exemplarily 440 kV/cm in FIG. 1b and 50 kV/cm in FIG. 1c.

Figure 2:
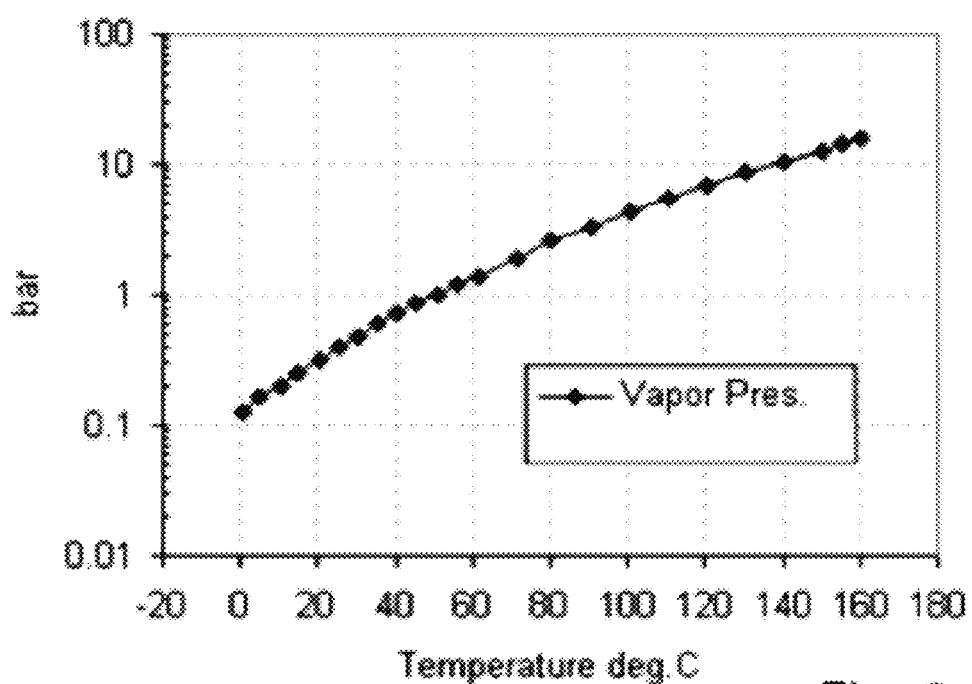
FIG. 2 shows a graphical representation of the vapour pressure of dodecafluoro-2-methylpentan-3-one as a function of the temperature.

In FIG. 2, the vapour pressure of dodecafluoro-2-methylpentan-3-one as a function of the temperature is shown. The (absolute) pressure of the insulating gas shall be chosen such that given the partial gas pressure of the fluoroketone (defined by the minimal operating temperature according to FIG. 2) the desired breakdown field strength is obtained.

As well, an operating temperature can be determined for a given breakdown field strength and absolute pressure of the system. For example, a breakdown field strength of 440 kV/cm at an absolute pressure of 2.5 bar is according to FIG. 1 achieved at a molar ratio of dodecafluoro-2-methylpentan-3-one of 0.5. The partial pressure of dodecafluoro-2-methylpentan-3-one in the insulation gas is thus 1.25 bar. According to FIG. 2, this partial pressure is obtained at a temperature of 56° C.

From FIG. 1b or 1c in combination with FIG. 2, a method for selecting the parameters of the insulation medium, such as absolute filling pressure, molar fraction or partial pressure of fluorketone and fluid management, in particular heating and/or vaporization of liquid phase fluorketone, and/or fluid reserve management of liquid phase fluorketone, can be deduced.

This method comprises the steps of:
determining for a given electrical apparatus a permissible electrical field strength of the desired insulation medium and a minimal permissible operating temperature of the desired insulation medium,
determining from the pressure-reduced breakdown field strength of the desired insulation medium as a function of the molar fraction of the fluorketone of the invention (see e.g. FIG. 1a), hereinafter preferably with 6 to 9 C-atoms and more preferably dodecafluoro-2-methylpentan-3-one, and from the permissible field strength the absolute pressure curve of the insulation medium as a function of the partial pressure of the fluorketone (see e.g. FIG. 1b or FIG. 1c),
selecting a desired absolute filling pressure of the insulation medium (which is typically defined for some standard conditions and may, e.g., be based on constructive and/or operational constraints of the electrical apparatus),
determining from the absolute pressure curve the minimal required partial pressure of the fluorketone, and from the vapour pressure curve the corresponding vaporization temperature of the fluorketone, and
determining whether the vaporization temperature is above the minimal permissible operating temperature of the desired insulation medium, and
only if the vaporization temperature is below the minimal permissible operating temperature of the desired insulation medium, providing a fluid management system, in particular means for heating and/or vaporization and/or fluid reserve management of liquid phase fluorketone, for maintaining the partial pressure above the minimal required partial pressure.

A further detailed example is shown in FIG. 1c in connection with FIG. 2 for a medium-voltage apparatus being rated to a given voltage level, from which the permissible electrical field strength of the desired insulation medium can be derived (e.g. 50 kV/cm), and being rated to an ambient temperature, from which the minimal permissible operating temperature of the desired insulation medium can be derived (e.g. −25° C.). According to FIG. 2 extrapolated to −25° C., the partial pressure of fluorketone of the invention, here exemplarily dodecafluoro-2-methylpentan-3-one, at −25° C. is approximately 0.025 bar, which according to FIG. 1c requires approximately 0.95 bar absolute filling pressure. This is below the (e.g. apparatus-specific) permissible filling pressure of e.g. 1.2 bar, such that no active vaporization of liquid fluorketone is needed.

A further dimensioning rule relates to the maximal permissible operating temperature of the desired insulation medium, e.g. 105° C. in high-voltage or medium-voltage apparatuses. According to FIG. 2, 105° C. corresponds to a fluorketone partial pressure 5 bar, which may result in the absolute pressure exceeding all permissible (e.g. apparatus-specific) pressure limits. This shall be avoided by limiting the amount of available liquid fluorketone and/or limiting the temperature, e.g. by active cooling. Therefore, in the apparatus a reserve volume of liquid fluorketone and/or a maximal permissible operating temperature of the desired insulation medium shall be limited such that the absolute filling pressure is maintained below a given pressure limit of the apparatus (maximal permissible operating pressure). The apparatus shall thus have a reserve volume of liquid fluorketone and/or means for limiting a maximal permissible operating temperature of the desired insulation medium such that the absolute filling pressure is maintained below a given pressure limit of the apparatus.

Figure 3A:
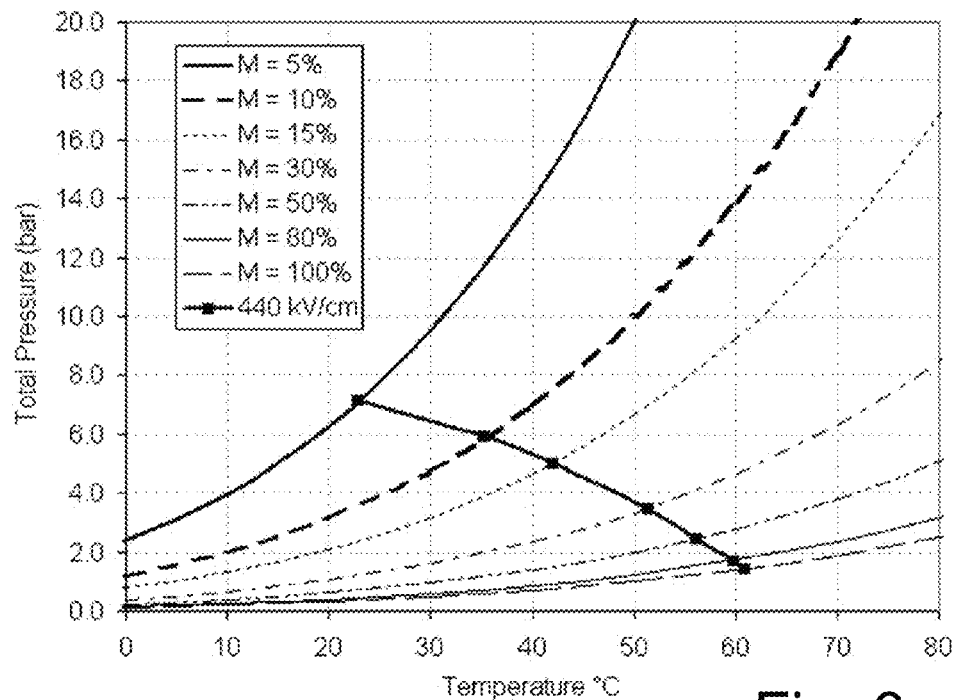
FIG. 3a, 3b, 3c show for various concentration levels, i.e. mole fractions, of dodecafluoro-2-methylpentan-3-one in air as carrier gas the respective pressure and temperature values at which an exemplary breakdown field strength of 440 kV/cm or 50 kV/cm is achieved.
Figure 3B:
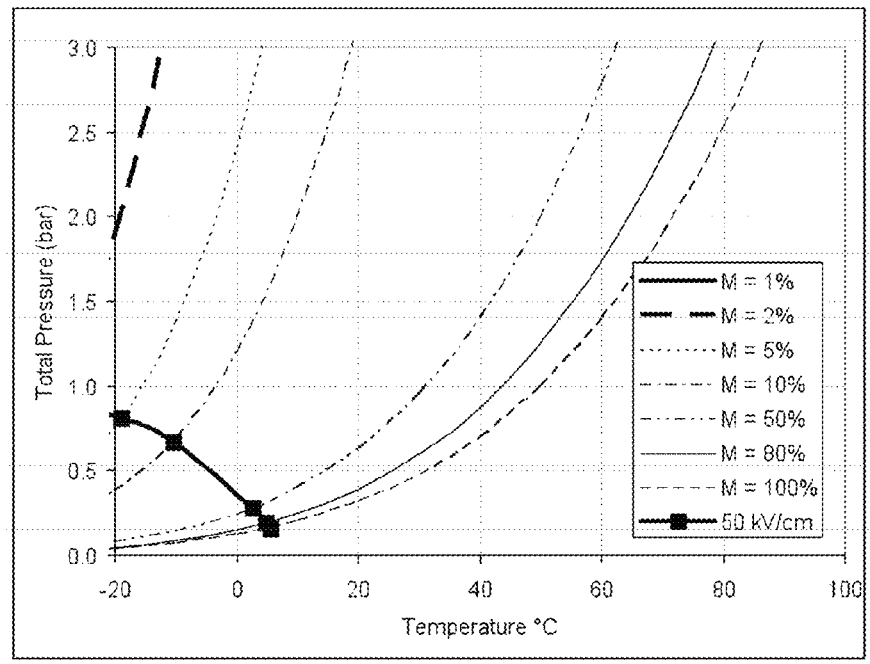
Figure 3C:
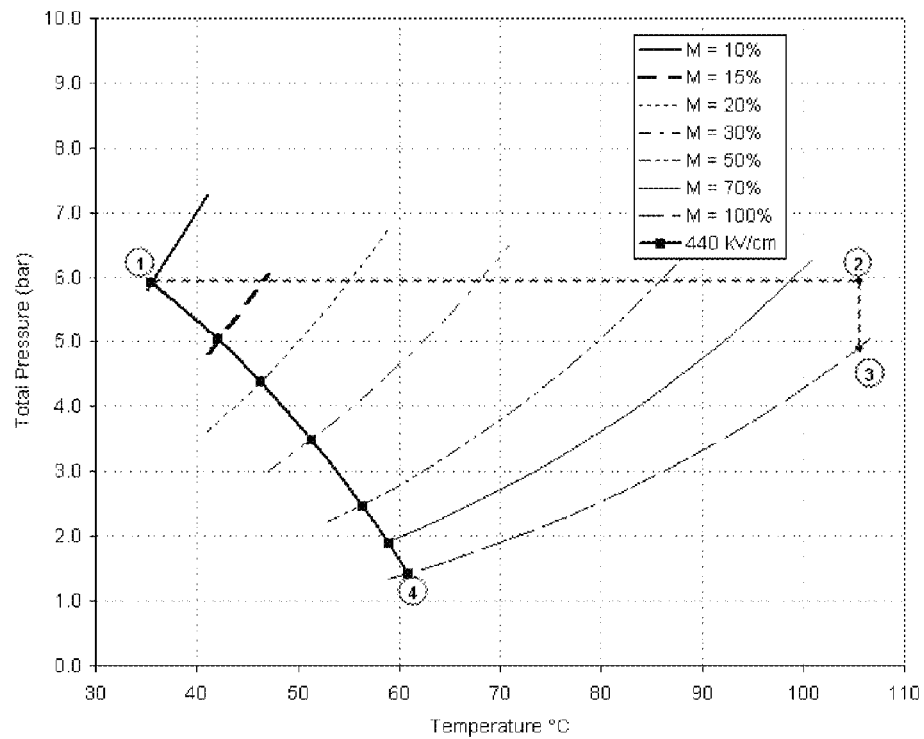

FIGS. 3a, 3b and 3c show further the relationship between the absolute filling pressure and the temperature of the insulation gas required to obtain a given breakdown field strength (=permissible electrical field strength, here exemplarily 440 kV/cm and 50 kV/cm, respectively) for various molar fractions M of the fluorketone of the invention. As is apparent, the dielectric field strength of the insulation gas can be increased by increasing the molar ratio M of the fluoroketone, in this particular case of dodecafluoro-2-methylpentan-3-one, and/or by increasing the total or absolute filling pressure. In FIG. 3a for example, a high-voltage breakdown field strength of 440 kV/cm is achieved at a pressure of about 7 bar and a temperature of about 22° C., the molar ratio of the fluoroketone being 5%. The same breakdown field strength is achieved at a pressure of less than 2 bar, but a temperature of 60° C., the molar ratio of fluoroketone being 100%.

In FIG. 3b for example, a medium-voltage breakdown field strength of 50 kV/cm is achieved at an absolute filling pressure of about 0.8 bar and a temperature of about −20° C., the molar ratio of the fluoroketone being 5%. The same breakdown field strength is achieved at a pressure of about 0.1 bar and a temperature of about 5° C., the molar ratio M of fluoroketone being 100%.

FIG. 3c shows once more the admissible parameter range for the case of a high-voltage breakdown field strength of 440 kV/cm. The horizontal dashed line between points 1 and 2 represents the apparatus-specific maximal permissible absolute pressure, here e.g. 6 bar. The vertical dashed line between points 2 and 3 represents the maximal permissible operating temperature, here e.g. 105° C. The limiting absolute pressure curve for molar ratio M=100% extends between points 4 and 3. The drawn-through curve between points 1 and 4 is the absolute pressure curve as a function of temperature and of molar ratio of fluorketone of the invention, here e.g. dodecafluoro-2-methylpentan-3-one, as taken from FIG. 3a. The encircled area, i.e. the area delimited by the lines connecting in sequence the points 1-2-3-4-1, defines the range of admissible parameters, namely absolute filling pressures, operating temperatures of the desired insulation medium, and molar ratios (or correspondingly partial pressures) of the fluorketone of the invention for a selected breakdown field strength or permissible electrical field strength.

As mentioned above, the electrical apparatus of the present invention can comprise a control unit (or "fluid management system") in order to adapt the pressure, the composition and/or the temperature of the insulating medium.

Figure 4:
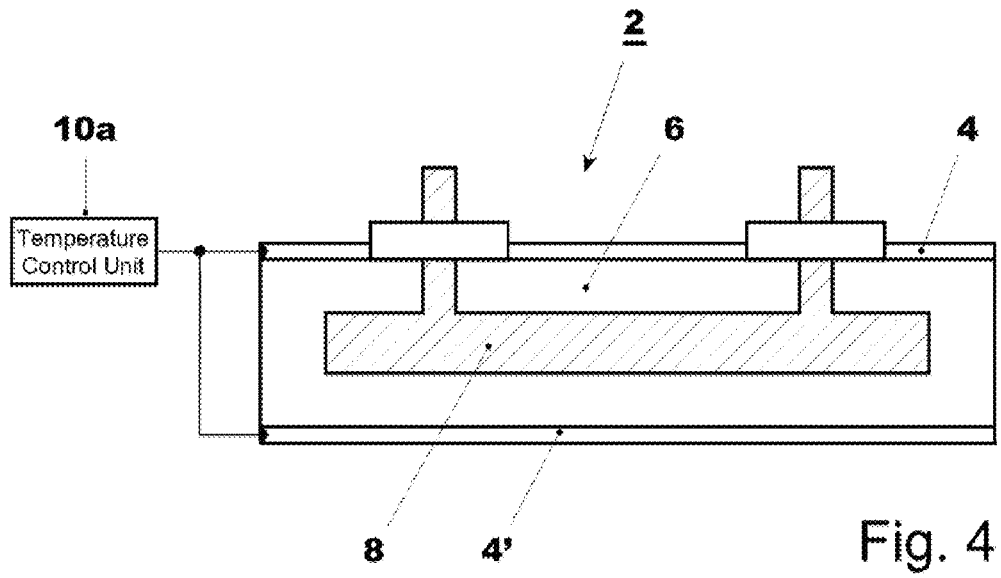
FIG. 4 shows a purely schematic representation of a high voltage gas-insulated switchgear according to the present invention comprising a temperature control unit.

As an example, a high voltage switchgear comprising a temperature control unit is shown in FIG. 4. The switchgear 2 comprises a housing 4 defining an insulating space 6 and an electrical active part 8 arranged in the insulating space 6. The switchgear 2 further comprises a temperature control unit 10a for setting the housing 4, or at least a part of the housing 4, of the switchgear and thus the insulation medium comprised in the insulating space 6 to a desired temperature. Of course, any other part in contact with the insulation medium can be heated in order to bring the insulation medium to the desired temperature. Thus, the vapour pressure of the fluoroketone—and consequently its molar ratio in the insulation gas—as well as the absolute pressure of the insulation gas can be adapted accordingly. As also shown in FIG. 4, the fluoroketone is in this embodiment not homogenously distributed throughout the insulating space due to the temperature gradient given in the insulation space. The concentration of the fluoroketone is thus higher in close proximity to the walls 4' of the housing 4.

Figure 5:
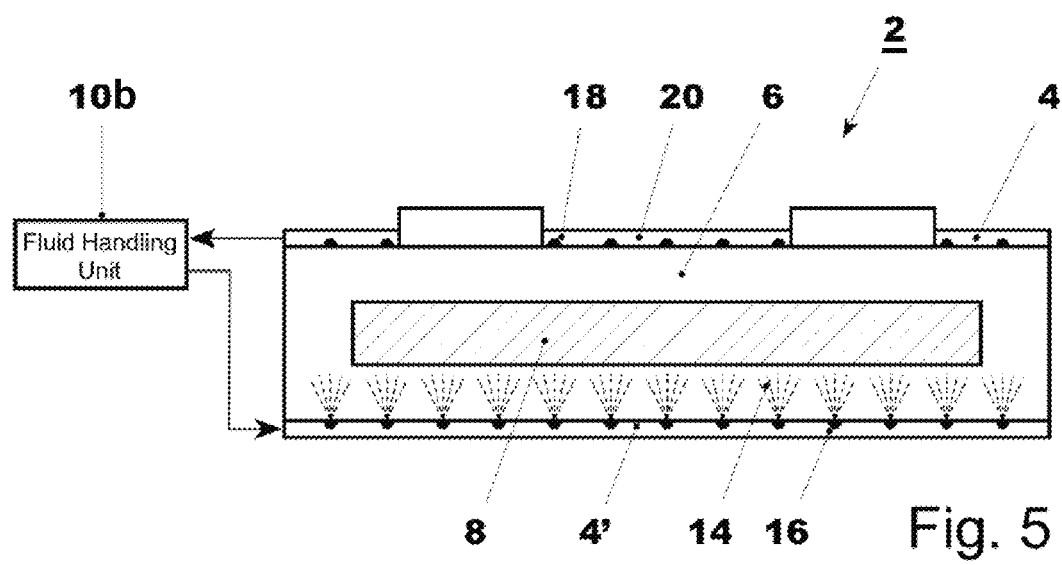
FIG. 5 shows a purely schematic representation of a high voltage gas-insulated switchgear according to the present invention comprising a fluid handling unit.

An alternative control unit or fluid management system is schematically shown in FIG. 5 in which a fluid handling unit 10b is attributed to the gas-insulated switchgear as the control unit. According to this control unit, the composition of the insulating medium, and in particular its concentration of the fluoroketone, is adjusted in a respective dosing unit comprised in the fluid handling unit 10b, and the resulting insulation medium is injected or introduced, in particular sprayed, into the insulating space 6. In the embodiment shown in FIG. 5, the insulation medium is sprayed into the insulating space in the form of an aerosol 14 in which small droplets of liquid fluoroketone are dispersed in the respective carrier gas. The aerosol 14 is sprayed into the insulating space 6 by means of nozzles 16 and the fluoroketone is readily evaporated, thus resulting in an insulating space 6 with an inhomogenous concentration of fluoroketone, specifically a relatively high concentration in close proximity of the housing wall 4' comprising the nozzles 16. Alternatively, the insulation medium, in particular its concentration, pressure and temperature, can be controlled in the fluid handling unit 10b before being injected into the insulation space. In order to ensure circulation of the gas, further openings 18 are provided in the upper wall 4" of the housing 4, said openings leading to a channel 20 in the housing 4 and allowing the insulating medium to be removed from the insulating space 6. The switchgear with fluid handling unit 10b, as shown in FIG. 5, can be combined with the temperature control unit 10a described in connection with FIG. 4. If no temperature control unit is provided, condensation of the fluoroketone can occur. The condensed fluoroketone can be collected and reintroduced into the circulation of the insulation medium.

In the context of the switchgears shown in FIGS. 4 and 5 it is noted that nominal current load generally facilitates the vaporization of the fluoroketone by the ohmic heating of current carrying conductors.

What is claimed is:

1. A dielectric insulation medium comprising an insulation gas, said insulation gas comprising at operational conditions a fluoroketone having from 4 to 12 carbon atoms, characterized in that the fluoroketone has a boiling point of at least −5° C. at ambient pressure, the insulation gas is a gas mixture which comprises oxygen mixed with carbon dioxide and/or nitrogen, and a molar percentage of the fluoroketone in the insulation gas is at least 10%.

2. The insulation medium according to claim 1, characterized in that the fluoroketone has the general structure

R1-CO—R2 wherein R1 and R2 are at least partially fluorinated chains, said chains being independently from each other linear or branched and having from 1 to 10 carbon atoms.

3. The insulation medium according to claim 1, characterized in that the fluoroketone has from 4 to 10 carbon atoms.

4. The insulation medium according to claim 1, characterized in that the fluoroketone has from 4 to 8 carbon atoms.

5. The insulation medium according to claim 3, characterized in that the fluoroketone has 6 carbon atoms.

6. The insulation medium according to claim 5, characterized in that the fluoroketone is dodecafluoro-2-methylpentan-3-one.

7. The insulation medium according to claim 1, characterized in that the molar percentage of the fluoroketone in the insulation gas is at least 15%.

8. An apparatus for the generation, the distribution and the usage of electrical energy, said apparatus comprising a housing defining an insulating space and an electrical active part arranged in the insulating space, said insulating space comprising the dielectric insulation medium according to claim 1.

9. The apparatus according to claim 8, the insulation gas pressure being, during operation of the apparatus, in a range from 1 bar to 1.5 bar.

10. The apparatus according to claim 8, the partial pressure of the fluoroketone being at least 0.6 bar.

11. The apparatus according to claim 10, the partial pressure of the fluoroketone being at least 0.9 bar.

12. The apparatus according to claim 8, said apparatus being a medium or high voltage apparatus.

13. The apparatus according to claim 8, said apparatus being a switchgear, in particular an encapsulated switchgear, more particularly an air-insulated or gas-insulated switchgear or a part or component thereof.

14. The apparatus according to claim 13, the apparatus being a bus bar, a bushing, a cable, a gas-insulated cable, a cable joint, a current transformer, a voltage transformer, a surge arrester, an earthing switch, a disconnector, a load-break switch, and/or a circuit breaker.

15. The apparatus according to claim 8, the apparatus being a switch, in particular an earthing switch, more particularly a fast acting earthing switch, a disconnector, a load-break switch or a circuit breaker, in particular a medium-voltage circuit breaker, a generator circuit breaker and/or a high-voltage circuit breaker.

16. The apparatus according to claim 8, the apparatus being a distribution transformer or a power transformer.

17. A dielectric insulation medium comprising an insulation gas, said insulation gas comprising at operational conditions a fluoroketone having from 4 to 10 carbon atoms and having the general structure

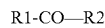

wherein R1 and R2 are at least partially fluorinated chains, said chains being independently from each other linear or branched and having from 1 to 10 carbon atoms, characterized in that the fluoroketone has a boiling point of at least −5° C. at ambient pressure, the insulation gas is a gas mixture which comprises oxygen mixed with carbon dioxide and/or nitrogen, and a molar percentage of the fluoroketone in the insulation gas is at least 10%.

18. The insulation medium according to claim 17, characterized in that the fluoroketone has from 4 to 8 carbon atoms.

19. The insulation medium according to claim 17, characterized in that the fluoroketone has 6 carbon atoms.

20. The insulation medium according to claim 17, characterized in that the molar percentage of the fluoroketone in the insulation gas is at least 15%.

21. The insulation medium according to claim 17, characterized in that the fluoroketone is a perfluorinated ketone having the molecular formula $C_6F_{12}O$.

22. The insulation medium according to claim 17, characterized in that the molar percentage of the fluoroketone in the insulation gas is at least 15%.

* * * * *